UNITED STATES PATENT OFFICE.

LYMAN GUINNIP, OF CHICAGO, ILLINOIS.

PROCESS OF BUTTER-MAKING.

SPECIFICATION forming part of Letters Patent No. 432,235, dated July 15, 1890.

Application filed March 11, 1887. Serial No. 230,544. (No specimens.)

*To all whom it may concern:*

Be it known that I, LYMAN GUINNIP, of Chicago, in the county of Cook and State of Illinois, have invented certain new and useful Improvements in the Process of Butter-Making; and I do hereby declare that the following is a full, clear, and exact description of the invention, which will enable others skilled in the art to which it pertains to make and use the same.

Butter has usually been made by churning the separated cream or the cream and milk unseparated. The product is by the ordinary process simply the oleaginous components of the milk, and the other valuable food material in the milk is entirely wasted.

The object of my invention is to make butter which shall contain a much larger proportion of the valuable food material in the milk and be more nutritious and palatable than ordinary butter.

My invention consists, essentially, in churning the entire milk (that is, the milk and unseparated cream) at a certain stage of fermentation and combined with a certain proportion of ordinary butter.

In the use of my process I set the milk in any convenient receptacles in a warm room at a temperature of from 70° to 96° Fahrenheit, the essential thing being to cause the milk to sour or clabber, which will ordinarily occur in fifteen to sixty hours. I then put the entire contents of the milk-receptacles in a suitable churn and add to it from one to four pounds of ordinary butter to the gallon of milk. The proportion is governed by the richness of the milk—that is, in the case of milk very rich in oleaginous material one pound is sufficient. Where the milk is very poor in such material four pounds of butter may be required to secure the best results. A little experience will best enable the user to judge of the amount which is desirable. Any proportion of butter approaching the limits given seems to answer in a degree. I have found that if an inferior quality of butter is employed it will be greatly improved and sweetened by use in my process. The entire mass is then churned, and the butter produced is colored, washed, worked, and salted like ordinary dairy-butter. By treating milk in this way I succeed in producing eight to twelve pounds of good butter to every one hundred pounds of milk used. In explanation of this I may say that one hundred pounds of milk contain four pounds each of ordinary butter or oleaginous material, caseine and sugar, one pound of salts, and eighty-seven pounds of water.

By the ordinary process the creameries get only four pounds of butter to one hundred pounds of milk, and this of little real nutritive value, while I combine in what to all appearances is a rich palatable butter of far greater nutritive value than the other nearly all the solids of the milk, and thus produce from ten to twelve pounds of butter to the one hundred pounds of milk.

To make the butter, although I prefer the process described without variation, I may, where diminished bulk is a desideratum, pour off the water or whey, or a part thereof, and churn the risen cream and clabber together without the watery portion of the milk.

In my process patented under date of January 19, 1886, No. 334,430, the churning was not a continuous operation, but carried on at intervals, and at stages in the process milk or cream of different ages was added to the mixture. Now I have by experiment discovered that if the churning be carried on continuously instead of at intervals, and milk of one age be used from beginning to end of the process without the addition of milk at stages in the process, a larger yield of butter and of a better quality is produced. I have also discovered that it is an advantage—that is, it facilitates the operation—to withdraw the whey or water and to churn only the remaining solid portions of the clabbered milk or cream.

I claim—

1. The within-described process of making butter, consisting in setting the milk or cream until it is soured or clabbered and then churning the same with a proportion of butter added thereto, the said churning being carried on as a single continuous operation and with the milk or cream used in the first steps of the treatment, substantially as and for the purposes set forth.

2. The within process of making butter, consisting in setting the milk or cream until it is soured or clabbered, then withdrawing the whey or water therefrom, and then churning the milk with a proportion of butter added thereto to form butter, substantially as set forth.

In testimony that I claim the foregoing as my own I affix my signature in presence of two witnesses.

LYMAN GUINNIP.

Witnesses:
 E. H. BOTTUM,
 CHAS. L. GOSS.